(12) United States Patent
Noda

(10) Patent No.: US 6,819,816 B2
(45) Date of Patent: Nov. 16, 2004

(54) ACTUATOR, OPTICAL FIBER MOVING APPARATUS, AND OPTICAL SWITCH

(75) Inventor: Shunji Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 229 days.

(21) Appl. No.: 10/121,244

(22) Filed: Apr. 12, 2002

(65) Prior Publication Data

US 2002/0150325 A1 Oct. 17, 2002

(30) Foreign Application Priority Data

Apr. 13, 2001 (JP) ........................................ 2001-114888

(51) Int. Cl.[7] .............................................. G02B 6/26
(52) U.S. Cl. ............................................. 385/16; 385/6
(58) Field of Search ............................ 385/6, 7, 16–24, 385/147

(56) References Cited

U.S. PATENT DOCUMENTS 6,678,434 B1 * 1/2004 Goodman et al. ............ 385/16

FOREIGN PATENT DOCUMENTS

| JP | 4-360025 | 12/1992 |
| JP | 7-218848 | 8/1995 |
| JP | 8-266073 | 10/1996 |
| JP | 2000-333480 A | 11/2000 |

* cited by examiner

Primary Examiner—Phan T. H. Palmer
(74) Attorney, Agent, or Firm—Scully, Scott, Murphy & Presser

(57) ABSTRACT

A moving body (10) is composed of a main body (11), piezoelectric elements (13), (13') secured to the sides of the main body in the traveling direction thereof, and coils (12), (12') secured to the piezoelectric elements (13), (13'). A magnet is disposed on a guide rail and the coils (12), (12') are energized, and whereby the moving body (10) can be moved a long distance at high velocity by a magnetic type linear motor system. Further, the coils (12), (12') are energized, the main body (11) is pressed against the guide rail on which the magnet is mounted by the magnetic force that is generated by the energization of the coils (12),(12') and the piezoelectric elements (13), (13') are extended and contracted by a voltage applied thereto, thereby the moving body (10) is impact driven. With this operation, the moving body can be micro driven at a pinpoint accuracy.

3 Claims, 15 Drawing Sheets

ACTUATOR, OPTICAL FIBER MOVING APPARATUS, AND OPTICAL SWITCH

BACKGROUND OF THE INVENTION

1. Field of the Invention

The present invention relates to an actuator, an optical fiber moving apparatus driven by the actuator and an optical switch driven by the actuator, and more particularly, to an actuator having a rough moving means using a linear moter mechanism and a micro moving means using a thrust force obtained by converting electric energy into kinetic energy.

2. Description of the Related Art

Conventionally, there are known an actuator for executing inchworm operation and an actuator driven by impact drive by using, for example, a piezoelectric element, as actuators for obtaining a thrust force by converting electric energy into kinetic energy.

The operation principle of the inchworm operation will be described here with reference to FIG. 18. An inchworm mechanism, which is composed of bodies 41 and 42 and piezoelectric elements 43-1 to 43-3 extendable in two-axes directions, is placed on a slide surface 44 (FIG. 18(a)). First, the piezoelectric element 43-1 extends in an upward direction orthogonal to a traveling direction by the voltage applied thereto, thereby the body 41 is lifted upward (FIG. 18(b)). Next, the piezoelectric element 43-2 extends in the traveling direction by the voltage applied thereto (FIG. 18(c)). After the piezoelectric element 43-2 extends to its full length, only the voltage applied to the piezoelectric element 43-1, which has extended upward, is shut off, and the body 42, which has been lifted upward, returns onto the slide surface 44 (FIG. 18(d)).

Next, the piezoelectric element 43-3 is extended in the upward direction orthogonal to the traveling direction by the voltage applied thereto, and the body 41 is lifted upward thereby (FIG. 18(e)). The voltage applied to the piezoelectric element 43-2, which has extended in the traveling direction, is shut off, and the piezoelectric element 43-2 returns to its original length (FIG. 18(f)). Finally, the voltage applied to the piezoelectric element 43-3 is shutoff, and the body 41, which has been lifted upward, returns onto the slide surface 44 (FIG. 18(g)). As a result, the bodies 41 and 42 moves forward in the traveling direction by the amount of expansion of the piezoelectric element 43-2.

The bodies 41 and 42 can be moved in an opposite direction by applying a voltage to the piezoelectric elements 43-1 and 43-2 in a reverse sequence.

Further, there is an impact drive mechanism acting as a micro actuator mechanism, in addition to the above inchworm mechanism. The operation principle of the impact drive mechanism will be also described with reference to FIG. 19. The impact drive mechanism is arranged such that a body 51 is joined to a body 52 through a piezoelectric element 53. The body 51 is pressed against a slide surface 54 by the pressure force F applied thereto. (FIG. 19(a)). When the piezoelectric element 53 is extended as shown in the figure by the voltage abruptly applied thereto, the body 51 begins to slide left on the slide surface 54 because the inertial force of the body 51 overcomes the friction between the body 51 and the slide surface 54. At the same time, the body 52 also moves right on the slide surface (FIG. 19(b)). Next, when the voltage applied to the piezoelectric element 53 is slowly released, the piezoelectric element 53 slowly returns to its original length. At this time, almost no inertial force is caused to both the bodies 51 and 52 because they have a small acceleration. Accordingly, the movement of the body 51 is prevented by the frictional force generated by the pressure force F between the body 51 and the slide surface 54. As a result, the amount of movement of the impact drive mechanism, which was made when the piezoelectric element 53 extended at the beginning, is maintained, and the overall shape thereof returns to its original shape (FIG. 19(c)). The repetition of this operation permits the impact drive mechanism to move in the direction of the body 51.

The impact drive mechanism can be moved in an opposite direction by slowly extending the piezoelectric element 53 at the beginning and then by abruptly contracting it when it extends to its full length.

The actuator disclosed in Japanese Unexamined Patent Publication (KOKAI) No. 4-360025 is known as an actuator using the above inchworm mechanism, and the actuator disclosed in Japanese Unexamined Patent Publication (KOKAI) No. 8-266073 is known as a conventional technology using the above impact drive mechanism.

A first problem of conventional actuators resides in that they cannot move a large distance at high velocity. This is because that only an inchworm mechanism and an impact drive mechanism are mounted thereon and these mechanisms are driven making use of the micro displacement of a piezoelectric element. That is, this type of the conventional actuators are arranged as an actuator specialized in micro drive and cannot move a large distance at high velocity.

A second problem of the conventional actuators resides in that they cannot be formed in a small size. This is because that when a conventional actuator is composed of only the micro actuators such as the inchworm mechanism and the impact drive mechanism, it is impossible to move it a long distance at high velocity. To cope with this problem, it is necessary to separately provide a high velocity drive mechanism such as a voice coil motor on the high velocity drive mechanism. As a result, the overall size of the conventional actuator is increased.

Therefore, when a mechanical type optical switch is composed of an optical fiber moving body using a conventional actuator, switching cannot be carried out at high velocity or a compact optical switch cannot be realized.

SUMMARY OF THE INVENTION

Accordingly, it is a first object of the present invention for solving the problems of the conventional technology to provide a small actuator capable of moving at high velocity and making positional alignment at a pinpoint accuracy. A second object of the present invention is to provide an optical fiber moving body capable of moving at high velocity and making positional alignment at a pinpoint accuracy. A third object of the present invention is to provide a compact optical switch capable of being switched at high velocity and having a less connection loss.

To achieve the above-noted objects, the present invention adopts the following basic technical constitution.

The first aspect of the present invention is an actuator for moving a movable body by using a thrust force obtained by converting electric energy into kinetic energy, comprising: a first means for moving the movable body at high velocity for rough positioning of the movable body; and a second means for moving the movable body at low velocity for accurate positioning of the movable body.

In the second aspect of the present invention, the first means is a moving section of a linear motor having a moving section and a stationary section.

In the third aspect of the present invention, the moving section of the linear motor comprises any of a coil, a permanent magnet, and a conductive body, and the stationary section of the linear motor comprising any of a permanent magnet and a coil.

In the fourth aspect of the present invention, the second means comprises a piezoelectric element.

In the fifth aspect of the present invention, the second means is controlled by impact drive or inchworm drive using a piezoelectric element.

The sixth aspect of the present invention is an actuator for controlling positioning of a movable body, comprising:
a main body of the movable body; a pair of piezoelectric elements secured to the main body; a pair of coils secured to the pair of piezoelectric elements; a guide for guiding the main body; and a plurality of magnets disposed along the guide.

In the seventh aspect of the present invention, the main body comprises a position detecting means for detecting a position thereof.

The eighth aspect of the present invention is an actuator for controlling positioning of a movable body, comprising:
a main body of the movable body; a piezoelectric element secured to the main body; a coil secured to the piezoelectric element; a guide for guiding the main body; and a plurality of magnets disposed along the guide.

The ninth aspect of the present invention is an optical switch comprising: a board having a first and second main surfaces; a first movable body to which a first optical fiber is secured; a first piezoelectric element secured to the first movable body; a first coil secured to the first piezoelectric element; a first guide, formed on the first surface, for guiding the first movable body; a plurality of permanent magnets disposed along the first guide; a second movable body to which a first optical fiber is secured; a second piezoelectric element secured to the second movable body; a second coil secured to the second piezoelectric element; a second guide, formed on the second surface and provided orthogonally to the first guide, for guiding the second movable body; a plurality of permanent magnets disposed along the second guide; and
a through hole formed at an intersection of the first guide and second guide provided on the board.

DESCRIPTION OF THE PREFERRED EMBODIMENTS

Next, embodiments of the present invention will be described below in detail with reference to the drawings.

(First Embodiment)

Figure 1A:
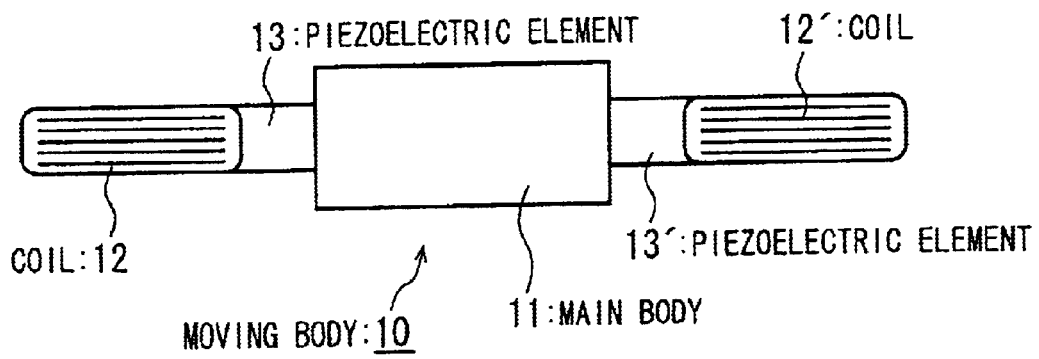
FIG. 1(a) and FIG. 1(b) are a plan view and a side elevational view of an actuator of a first embodiment of the present invention, respectively.
Figure 1B:
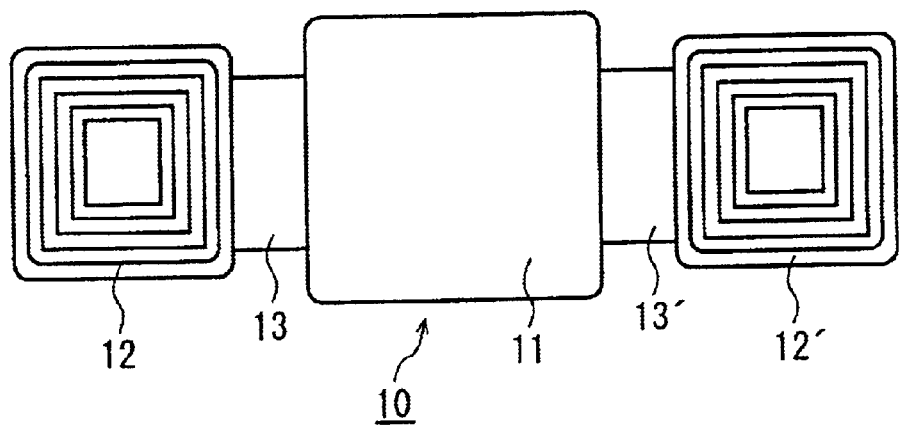
Figure 2:
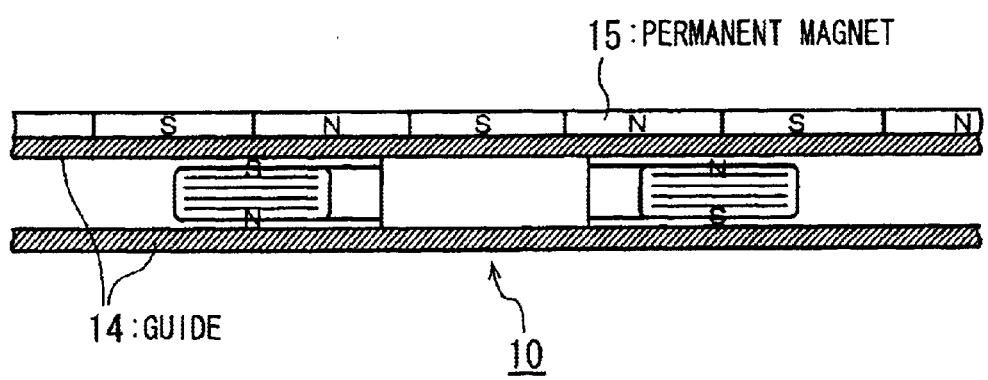
FIG. 2 is a plan view of the actuator of the first embodiment of the present invention mounted on guides.

FIG. 1(a) and FIG. 1(b) are a plan view and a side elevational view of an actuator of a first embodiment of the present invention, respectively. As shown in FIG. 1(a) and FIG. 1(b), the actuator of the first embodiment is composed of a moving body 10 in which piezoelectric elements 13 and 13' and coils 12 and 12' are joined to both the sides of the moving member 10. Further, as shown in FIG. 2, the moving body 10 is inserted between guides 14 and can move along the guides 14. Further, a permanent magnet 15 is disposed along one of the guides 14 so that S-poles and N-poles alternately appear along the guide 14.

Figure 3A:
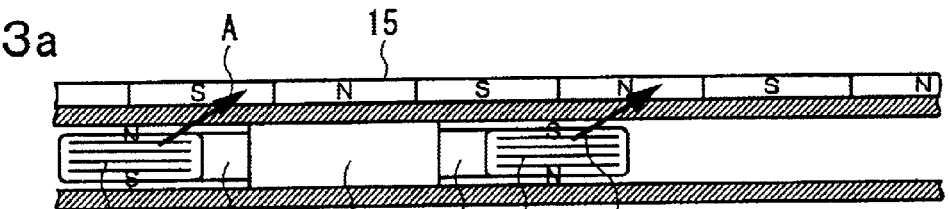
FIGS. 3(a) to (c) are views explaining operations of the actuator of the first embodiment of the present invention.
Figure 3B:
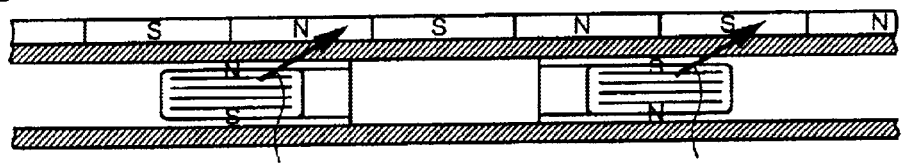
Figure 3C:
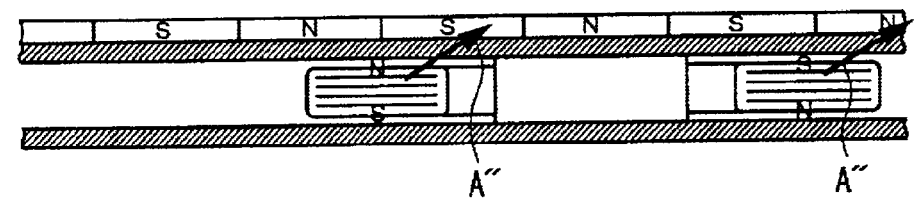

Next, an operation of the actuator of the first embodiment will be described. First, the high velocity operation (rough operation) of the actuator will be described with reference to FIG. 3. As shown in FIG. 3, the high velocity operation of the actuator is carried out by a principle similar to that of a so-called magnetic type linear motor. The coils 12 and 12', which are joined to the main body 11 through the piezoelectric elements 13 and 13', are energized, and magnetic fields are generated in the coils 12 and 12' such that the coils 12 and 12' near to an S-pole permanent magnet 15 and an N-pole permanent magnet 15 are set to an N-pole and an S-pole, respectively. An attractive force A is generated by the magnetic fields generated in the coils 12 and 12' between the coils and the permanent magnet 15 disposed along the guide 14. When the moving body 10 is moved by the attractive force A one block of the permanent magnet 15, the coils 12 and 12' are energized at opposite polarity, thereby a new attractive force A' is generated. Attractive forces A, A', and A" are generated by switching the energization of the coils 12 and 12', thereby a thrust force for moving the moving body 10 at high velocity can be obtained.

Figure 4A:
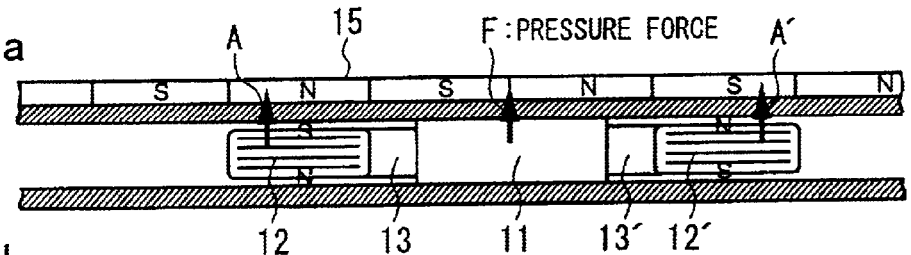
FIGS. 4(a) to (c) are views explaining operations of the actuator of the first embodiment of the present invention.
Figure 4B:
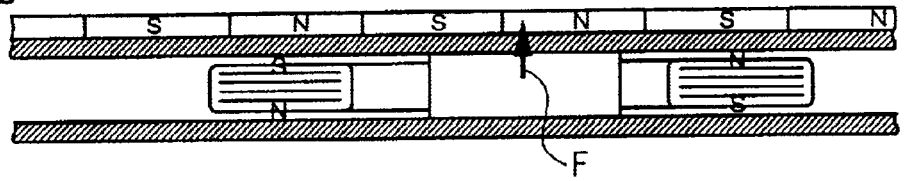
Figure 4C:
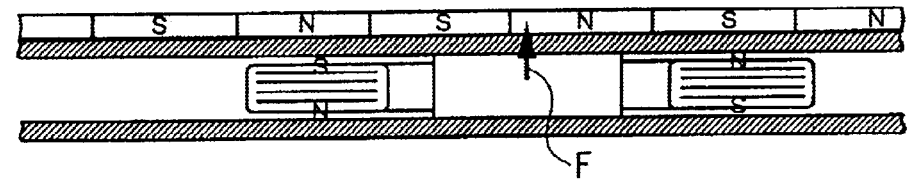
Figure 5A:
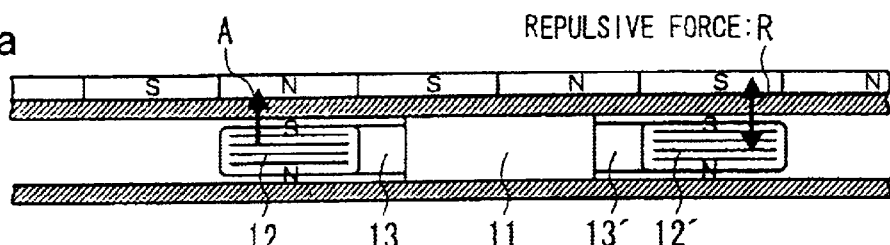
FIGS. 5(a) to (d) are views explaining other operations of the actuator of the first embodiment of the present invention.
Figure 5B:
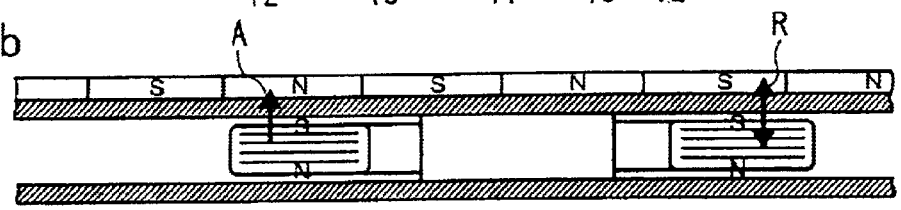
Figure 5C:
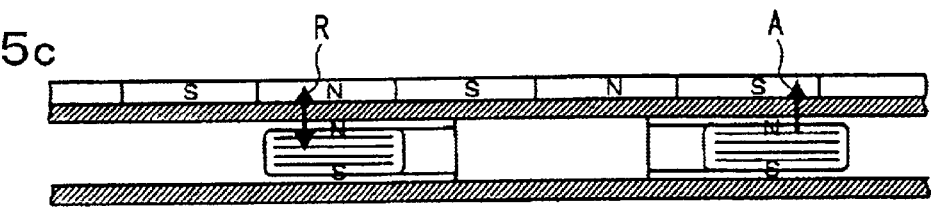
Figure 5D:
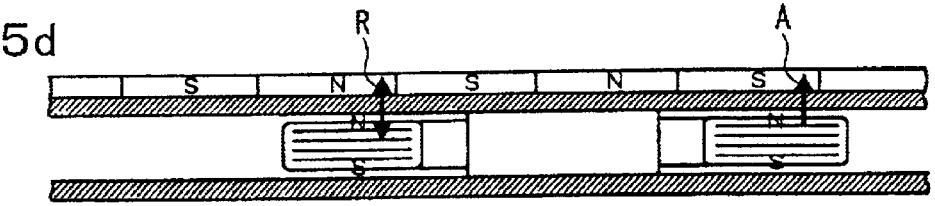

Next, the micro operation of the actuator will be described with reference to FIG. 4. The micro operation of the actuator of the first embodiment shown in FIG. 4 is carried out by a principle similar to that of so-called impact drive. The coils 12 and 12', which are joined to the main body 11 through the piezoelectric elements 13 and 13', are energized, and magnetic fields are generated in the coils 12 and 12' such that the coils 12 and 12' near to an S-pole permanent magnet 15 and an N-pole permanent magnet 15 are set to an S-pole and an N-pole, respectively. Attractive forces A and A' are generated by the magnetic fields generated in the coils 12 and 12' between the coils and the permanent magnets 15 disposed along the guide 14, respectively. A pressure force F for pressing the main body 11 against the guide 14 can be obtained by the attractive forces A and A'. When a voltage is abruptly applied to the piezoelectric element 13 in this state, the piezoelectric element 13 extends. Thus, the pressure force F causes the inertial force of the main body 11 to overcome the frictional force generated between the main body 11 and the guide 14, and the main body 11 begins to move in a right direction on the slide surface. At the same time, the coil 12 also moves in a left direction left on the slide surface.

Next, when the voltage applied to the piezoelectric element 13 is slowly released, the piezoelectric element 13 slowly returns to its original length. At this time, almost no inertial force is generated to both the main body 11 and the coil 12 because they have a small acceleration. Accordingly, the movement of the main body 11 is prevented by the frictional force generated between the main body 11 and the guide 14 by the pressure force F.

As a result, the amount of movement of the actuator, which is generated when the piezoelectric element 53 extended at the beginning, is maintained, and the overall shape of the actuator returns to its original shape. The main body 11 can be moved in the direction of the coil 12' by repeating this operation.

The actuator can be moved in an opposite direction by previously extending the piezoelectric element 13 slowly and then contracting it abruptly. Further, an operation similar to that described above can be carried out by using the piezoelectric element 13' disposed on the opposite side.

As described above, in the actuator of the first embodiment, magnetic type linear motor drive and impact drive can be realized by the single moving body, whereby there can be provided an actuator having the characteristics of both high velocity movement and positional alignment of a pinpoint accuracy. Further, a miniature actuator can be realized because the coils, which are used for the magnetic type linear motor drive, are integrated with the inertial body necessary to the impact drive as well as the magnetic force generated by the coils is used to obtain the pressure force necessary for the impact drive.

(Other Drive Method of the Actuator of the First Embodiment)

The method for micro driving the actuator of the first embodiment by the impact drive was described above. However, the actuator of the first embodiment can be also driven by an inchworm system. The inchworm drive system will be described with reference to FIG. 5. The coil 12 is energized and a magnetic field is generated in the coil 12 such that the portion thereof facing the N-pole permanent magnet 15 is set to an S-pole. An attractive force A is generated between the coil 12 and the N-pole permanent magnet 15 disposed along the guide 14 by the magnetic field generated in the coil 12. Further, the coil 12' disposed on the opposite side is energized and a magnetic field is generated in the coil 12' such that the portion thereof facing the S-pole permanent magnet 15 is set to an S-pole. A repulsive force R is generated by the magnetic field generated in the coil 12 between the coil 12' and the permanent magnet 15 disposed along the guide 14. In this state, a voltage is applied to the piezoelectric elements 13' and 13 so as to extend them. At this time, the main body 11 and the coil 12' are moved in the right direction on the slide surface by the amounts of extension of the piezoelectric elements 13 and 13' while the coil 12 held by the attractive force A remains stationary. Next, the coil 12 is energized on the contrary, and a magnetic force is generated thereby in the coil 12 so as to generate a repulsive force R between the coil 12 and the permanent magnet 15. Further, the coil 12' disposed on the opposite side is energized, and a magnetic field is generated in the coil 12' so as to generate an attractive force A between the coil 12' and the permanent magnet 15. In this state, the voltage applied to the piezoelectric elements 13' and 13 is released, and they are contracted to their original length. At this time, the main body 11 and the coil 12 are moved in the right direction on the sheet surface by the amounts of contraction of the piezoelectric elements 13 and 13' while the coil 12' held by the attractive force A remains stationary. As a result, the moving body can be moved by the amounts of extension of the two piezoelectric elements.

Note that, in the inch worm drive of the first embodiment, the coils may be simply deenergized so as to remove the magnetic field generated therein in place of generating the repulsive force by the coils.

Figure 1C:
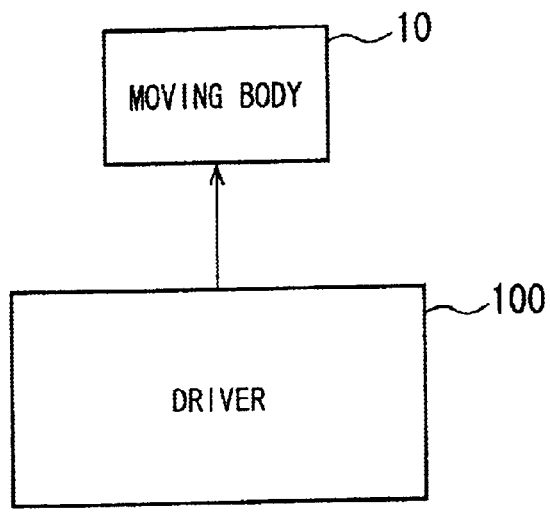
FIG. 1(c) is a block diagram of the first embodiment of the present invention.

FIG. 1(c) is a block diagram of the first embodiment of the present invention. In FIG. 1(c), the numeral 100 denotes a driving means for controlling the movable body 10 by impact drive or inchworm drive using the piezoelectric element 13 or/and 13'.

(Second Embodiment)

Figure 6A:
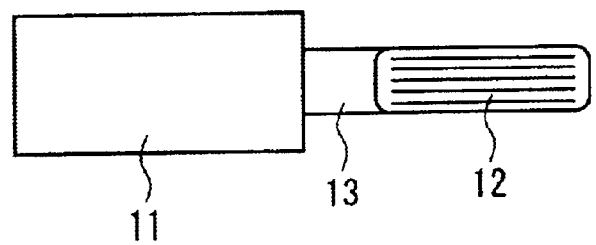
FIG. 6(a) and FIG. 6(b) are a plan view and a side elevational view of an actuator of a second embodiment of the present invention, respectively.
Figure 6B:
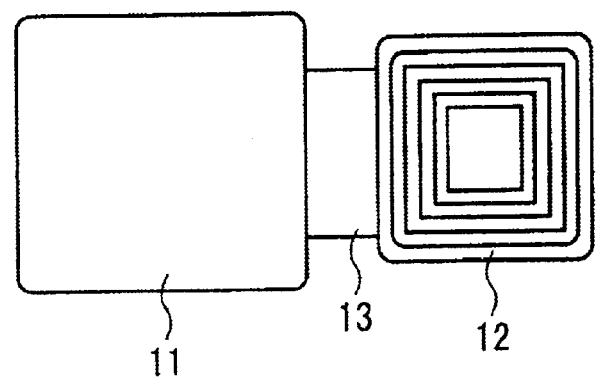

FIGS. 6(a) and 6(b) are a plan view and a side elevational view of an actuator of a second embodiment of the present invention. In the actuator of the second embodiment, a coil 12 and a piezoelectric element 13 are disposed on only one side of a main body 11 as shown in FIG. 6, while the coils and the piezoelectric elements are disposed on both the side of the main body 11 in the first embodiment.

The actuator of the second embodiment is driven at high velocity similarly to the fist embodiment. That is, an attractive force is generated between a permanent magnet disposed along a guide and a coil 12 by sequentially inverting the polarity of a current flowing in the coil 12, thereby a thrust force is obtained. When the actuator is micro moved, first, a current is supplied to the coil 12 to generate an attractive force between the coil 12 and the permanent magnet, and the piezoelectric element 13 is extended in this state, similarly to the inchworm drive. With this operation, the main body 11 is moved. Next, the current having been supplied to the coil 12 is shut off, and the voltage having been applied to the piezoelectric element 13 is slowly reduced, similarly to the impact drive system. At this time, the main body 11 remains stationary because a frictional force acts between the coil 12 and the guide, and only the coil 12 is moved toward the main body 11. The main body 11 can be moved in a direction opposite to the coil 12 by repeating this operation.

To move the main body 11 in an opposite direction, the sequence of the above operation is reversed so that the piezoelectric element 13 is slowly extended without supplying a current to the coil 12 and the voltage having been applied to the piezoelectric element 13 is released while restricting the movement of the coil 12 by supplying a current thereto.

(Third Embodiment)

Figure 7:
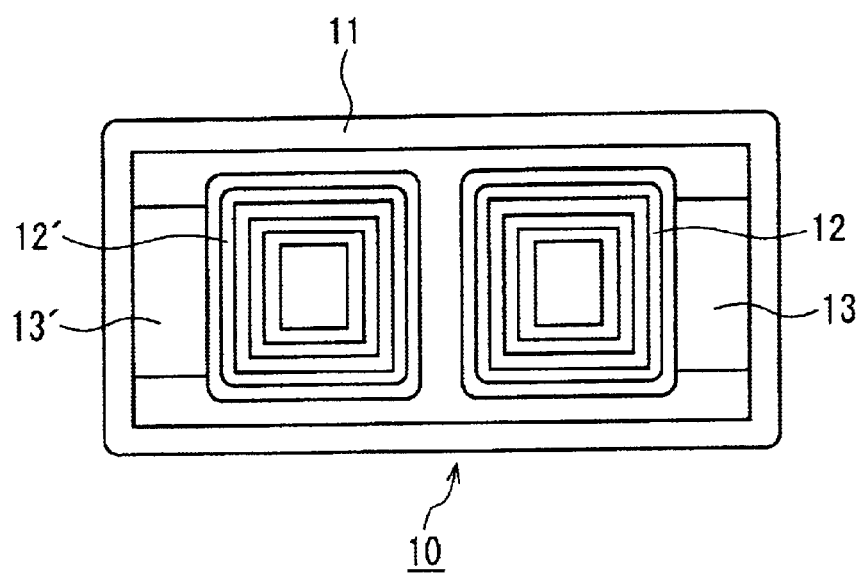
FIG. 7 is a side elevational view of an actuator of a third embodiment of the present invention.

FIG. 7 is a side elevational view of an actuator of a third embodiment of the present invention. In the first and second embodiments of the present invention, the coil(s) and the piezoelectric element(s) are disposed to the outside of the main body 11. In a moving body 10 of the third embodiment, however, two coils 12 and 12' are disposed in the inside of a main body 11 and connected to the wall surfaces of the main body 11 through piezoelectric elements 13 and 13', respectively, as shown in FIG. 7.

The actuator of the third embodiment is driven at high velocity, similarly to the fist embodiment. That is, a thrust force is obtained by generating an attractive force between a permanent magnet disposed along a guide and the coil 12 by sequentially inverting the polarity of a current flowing in the coil 12. Further, when the actuator is micro moved in a right direction on the slide surface, first, the piezoelectric element 13 is extended in a state that the attractive force is applied to the coil 12. Next, the current supplied to the coil 12 is shut off, and an attractive force is applied to the coil 12'. Then, the voltage having been applied to the piezoelectric element 13 is released in this state. After the current having been supplied to the coil 12' is shut off, the above-mentioned operations are repeated. Further, when the moving body 10 is moved in a left direction on the slide surface, the operations of the coils 12 and 12' and the piezoelectric elements 13 and 13' are inverted from the above operations thereof.

(Fourth Embodiment)

Figure 8:
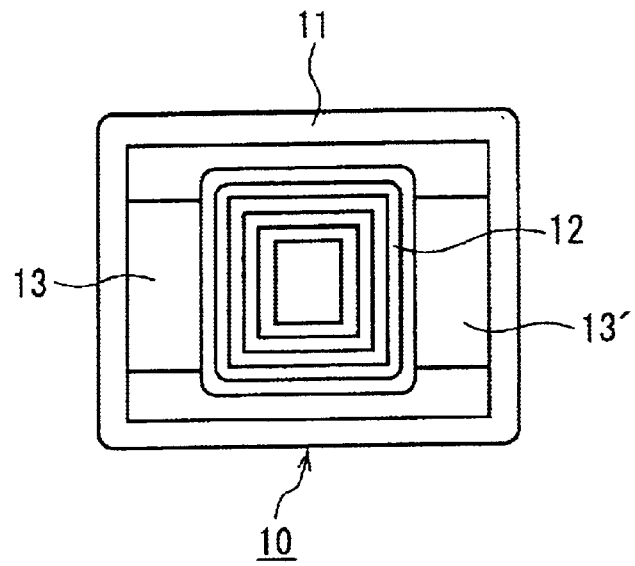
FIG. 8 is a side elevational view of an actuator of a fourth embodiment of the present invention.

FIG. 8 is a side elevational view showing an actuator of a fourth embodiment of the present invention. In the third embodiment of the present invention, the two coils and the two piezoelectric elements are disposed in the inside of the main body 11. In the fourth embodiment, however, a single coil 12 is disposed in the inside of a main body 11, and both the ends of the coil 12 are connected to the wall surfaces of the main body 11 through piezoelectric elements 13 and 13', as shown in FIG. 8.

The actuator of the fourth embodiment is driven at high velocity, similarly to the fist embodiment. That is, a thrust force is obtained by generating an attractive force between a permanent magnet disposed along a guide and the coil 12 by sequentially inverting the polarity of a current flowing in the coil 12. When the actuator is micro moved in a right direction on the slide surface, a current is supplied to the coil 12 so as to generate an attractive force between the coil 12 and the permanent magnet, and the piezoelectric element 13' is extended in this state, similarly to the inchworm drive. With this operation, the main body 11 is moved in the right direction. Next, the current supplied to the coil 12 is shut off, and the piezoelectric element 13 is extended and the piezoelectric element 13' is returned to its original length at the same time. Then, a current is supplied to the coil 12 so as to generate an attractive force between the coil 12' and the permanent magnet, and the piezoelectric element 13' is extended again and the piezoelectric element 13 is returned to its original length in this state. Thereafter, the above-noted operations are performed repeatedly.

(Fifth Embodiment)

Figure 9A:
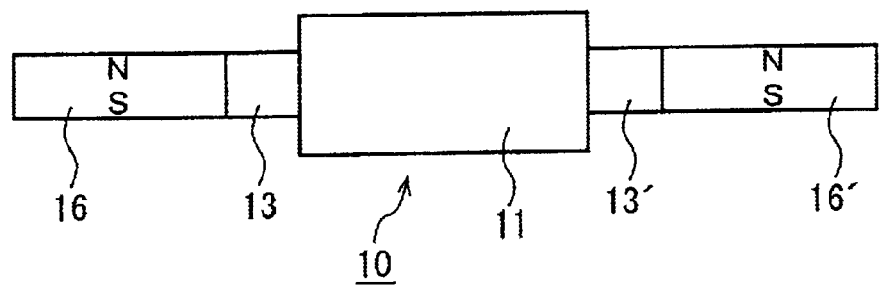
FIG. 9(a) is a plan view of an actuator of a fifth embodiment of the present invention.
Figure 9B:
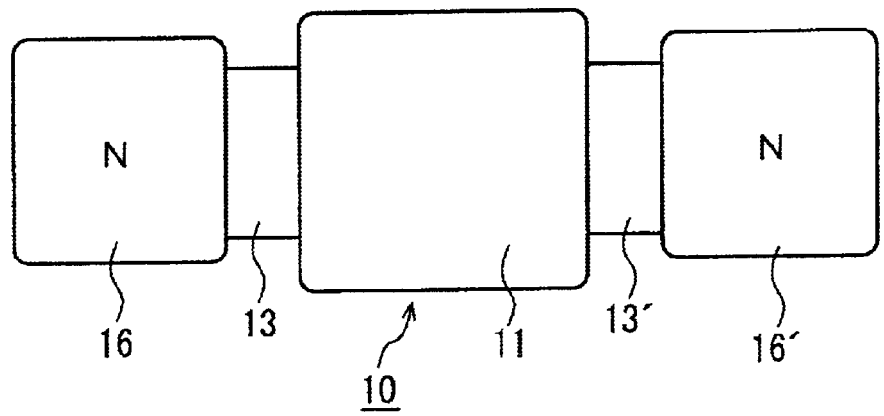
FIG. 9(b) is a side elevational view of the actuator.

FIGS. 9(a) and 9(b) are a plan view and a side elevational view of an actuator of a fifth embodiment of the present invention. While the actuators of the first to fourth embodiments of the present invention disposes the coil(s) on the moving body, in the fifth embodiment, a permanent magnet is joined to a moving body. That is, as shown in FIGS. 9(a) and (b), a moving body 10 is arranged such that permanent magnets 16 and 16' are connected to the right and left sides of a main body 11 through piezoelectric elements 13 and 13'.

Figure 10:
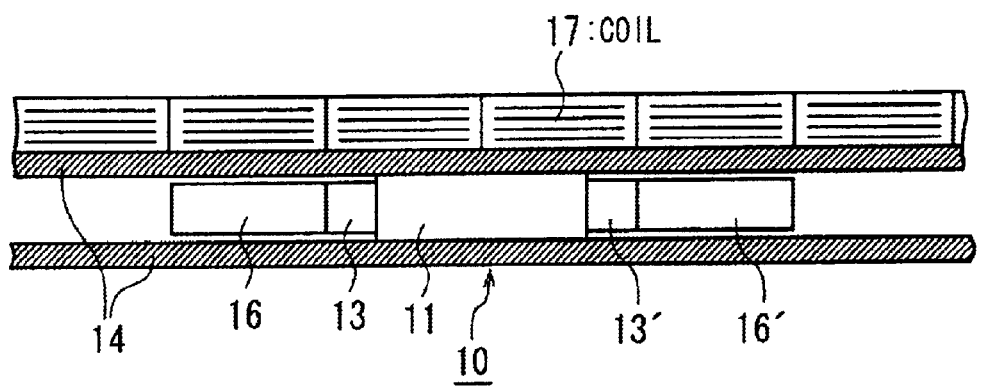
FIG. 10 is a plan view of the actuator of the fifth embodiment of the present invention mounted on guides.

Then, as shown in FIG. 10, the moving body 10 of the fifth embodiment is disposed between guides 14. Additionally, coils 17 which constitute a linear motor together with permanent magnets 16 and 16' are disposed along one of the guides 14.

In this fifth embodiment, the permanent magnet of the first embodiment is replaced with the coils thereof, and the operation of the fifth embodiment is the same as that of the first embodiment. Thus, the description of operation of the fifth embodiment is omitted.

While the fifth embodiment is arranged by replacing the coils of the first embodiment with the permanent magnets thereof, the permanent magnet of the second to fourth embodiments may be mounted on the moving body side by applying the same replacement thereto.

(Sixth Embodiment)

Figure 11A:
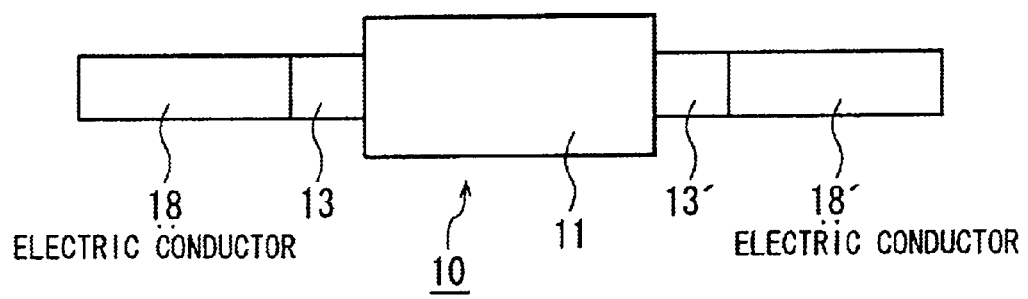
FIG. 11(a) and FIG. 11(b) are a plan view and a side elevational view of an actuator of a sixth embodiment of the present invention, respectively.
Figure 11B:
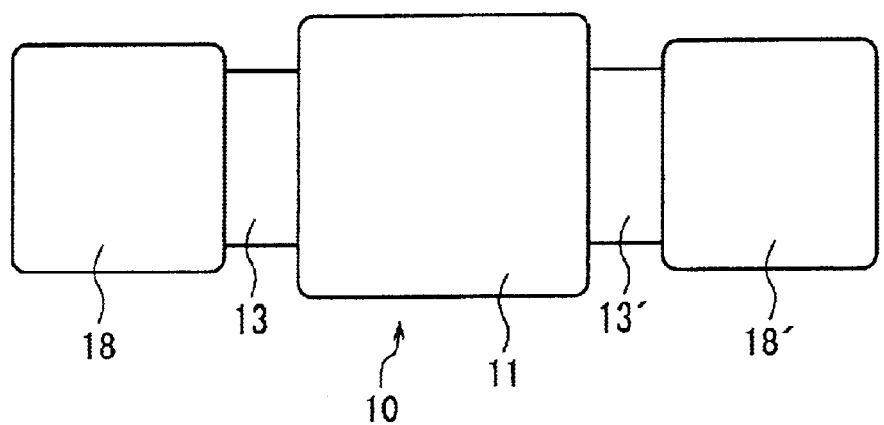
Figure 12:
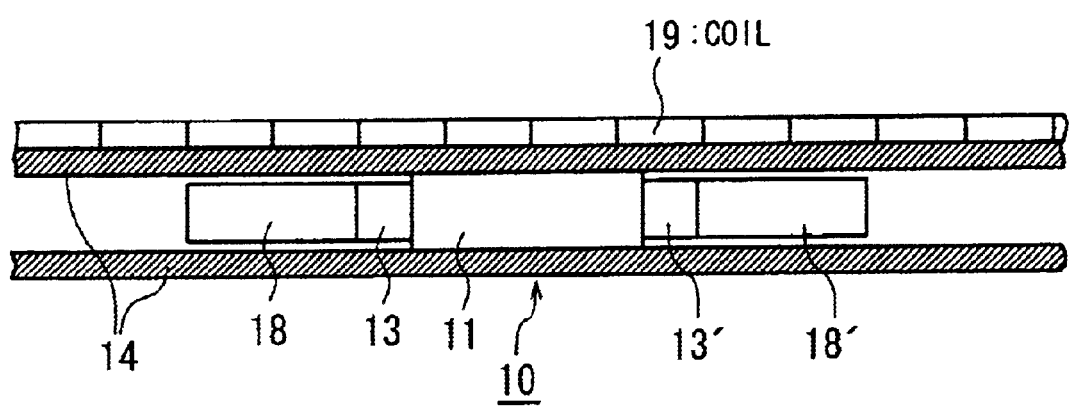
FIG. 12 is a plan view of the actuator of the sixth embodiment of the present invention mounted on guides.

FIGS. 11(a) and 11(b) are a plan view and a side elevational view of an actuator of a sixth embodiment of the present invention. While the actuators of the first to fifth embodiments described above are moved at high velocity by the magnetic type linear motor, the actuator of the sixth embodiment is moved at high velocity by an induction type linear motor. Accordingly, in the sixth embodiment, electric conductors 18 and 18' are connected to the front and back side surfaces of a main body 11 through piezoelectric elements 13 and 13', as shown in FIG. 11. The electric conductors 18 and 18' carry out a function as an inertial body when a moving body 10 of the sixth embodiment is driven by an impact drive system. Then, as shown in FIG. 12, the moving body 10 of the sixth embodiment is disposed between guides 14, and a coil 19 is disposed along the outside of one of the guides 14 to generate a moving magnetic field in the guides 14.

Next, an operation of the actuator of the sixth embodiment will be described. When the actuator is moved at high velocity, a moving magnetic field, which moves in a direction where the moving body 10 is moved, is generated by the coils 19. With this operation, the electric conductor 18 is subjected to a thrust force and moved at high velocity in the direction where the magnetic field moves. Further, when the moving body 10 is micro moved in a right direction on the slide surface, first, the piezoelectric element 13 is extended abruptly. Then, the piezoelectric element 13 is slowly contracted as well as the piezoelectric element 13' is extended slowly. At this time, the main body 11 remains stationary due to the frictional force between the main body 11 and the guides 14. Next, the piezoelectric element 13 is extended abruptly as well as the piezoelectric element 13' is contracted abruptly. With this operation, the main body 11 is moved in the right direction. The moving body 10 can be moved in the right direction on the slide surface by repeating the above operation.

The moving body 10 can be moved in an opposite direction by replacing the operation of the piezoelectric element 13 with that of the piezoelectric element 13'.

In the first and second embodiments of the present invention, the permanent magnet and the coil (s) are disposed along the guide in one row with respect to the moving body. However, it is possible to dispose a plurality of rows of permanent magnets and coils by disposing them along the guide where they were not disposed in the first and second embodiments or by disposing them on upper and lower portions of the sheet surface.

Further, the pressure force applied to the main body when it is impact driven is obtained from the magnetic force generated by the coil(s) or the magnetic body provided with the moving body. However, a different pressure application means may be provided and used.

EXAMPLE

Next, an example of the present invention will be described below in detail with reference to FIGS. 13 and 14(a) and 14(b).

Figure 13:
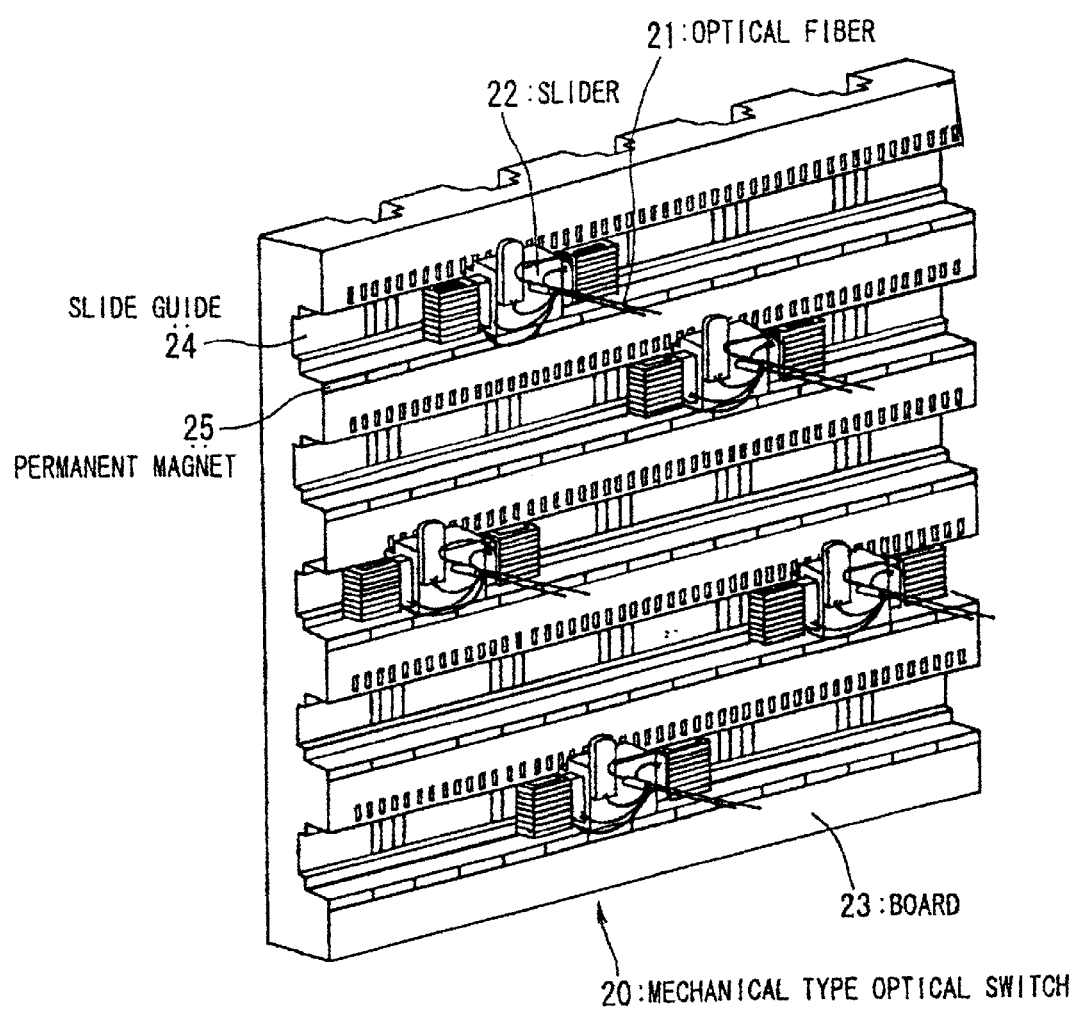
FIG. 13 is a perspective view showing a mechanical type optical switch of an example of the present invention.
Figure 14A:
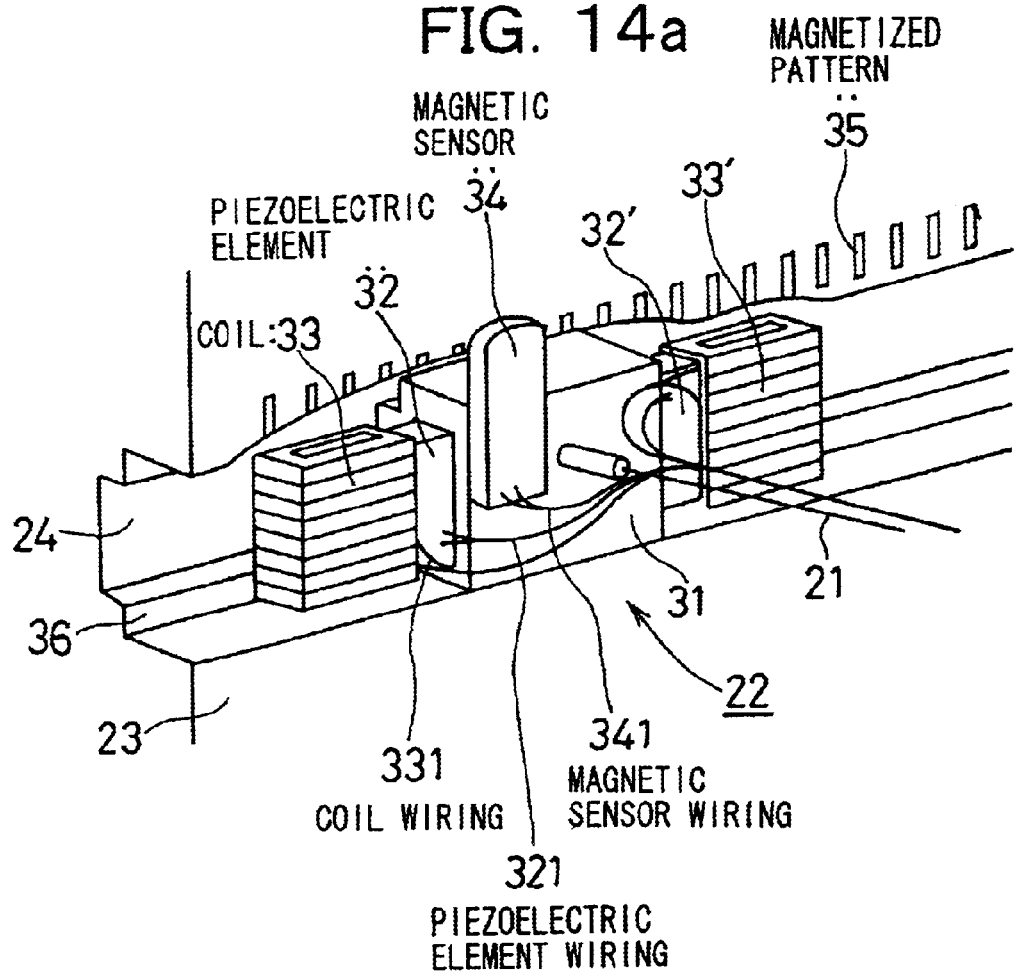
FIG. 14(a) is a partial enlarged view of the mechanical type optical switch shown in FIG. 13.

FIG. 13 is a perspective view showing the example of the present invention. In the example of the present invention, any of the actuators shown in the embodiments is applied to a mechanical type optical switch. As shown in FIG. 13, in a mechanical type optical switch 20 of the present invention, optical fibers 21 are inserted into sliders 22 and fixed therein so that they can linearly move integrally with the sliders 22. A standard optical fiber having a diameter of 125 $\mu$m is used as each optical fiber 21. The sliders 22 slide along slide guides 24 formed on a board 23 having a thickness of 10 mm. Each 100 pieces of the slide guides 24 are formed on the front and back surfaces of the board 23 so as to be orthogonal to each other. The number of the slide guides 24 is determined by the scale of optical switches, and 100×100 sets of optical switches are provided in this example. A permanent magnet is disposed such that S-poles and N-poles thereof are alternately arranged along the slide guide 24.

Next, the sliders 22 will be described in detail with reference to FIG. 14(a) and FIG. 14(b). FIG. 14(a) is a partial enlarged view of the mechanical type optical switch of FIG. 13 (in FIG. 14(a), a part of the board is omitted so that the figure can be understood easily), and FIG. 14(b) is a sectional view of the slider 22. The slider 22 is composed of a slider main body 31 into which an optical fiber 21 is inserted, piezoelectric elements 32 and 32' secured to the slider main body 31, and coils 33 and 33' secured to the piezoelectric elements 32 and 32. The slider 22 is arranged as a micro actuator that is impact driven. The slider main body 31 has a size of 5 mm that is approximately half the thickness of the board 23 in the height direction thereof in which the optical fiber is inserted. Further, the slider main body 31 has a length of 4 mm and a width of 2 mm. Stainless steel is used as a material of the slider main body 31. The end surface of the optical fiber 21 is flush with the bottom surface of the slider main body 31 or is slightly retracted therefrom (preferably 25 $\mu$m or less to suppress an insertion loss to a low level). The cladding thickness of the optical fiber 21 at the portion thereof inserted into the slider main body 31 may be set larger than that of the other portion thereof.

Each coil has a size half that of the slider main body 31 and is formed in an approximately rectangular prism of 3 mm×3.3 mm×1.8 mm. Further, a copper wire is used as a winding material of each coil. A coil wiring 331 is taken out to the outside so as to travel along an optical fiber 21. A PZT laminated type piezoelectric element having a length of 5 mm and a cross section of 2 mm×1 mm is used as each piezoelectric element. A magnetic sensor 34 is attached to the slider main body 31 so as to detect the position of the micro actuator.

Figure 14B:
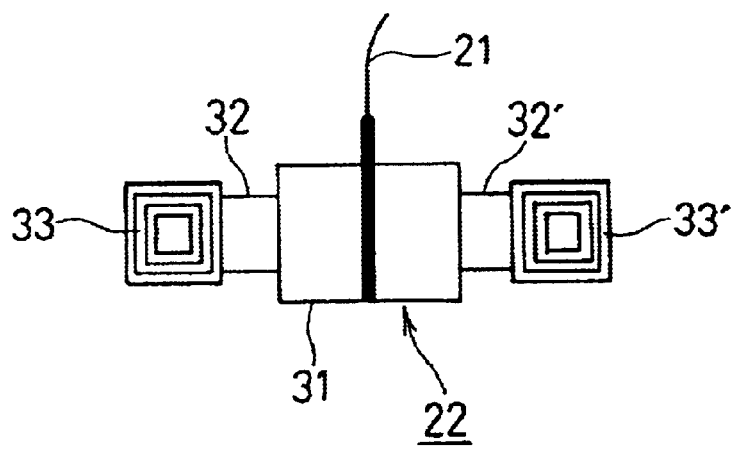
FIG. 14(b) is a sectional view of a slider.

As shown in FIG. 14(b), a through hole is formed through the slider main body 31, and the optical fiber 21 is inserted therethrough, and bonded and secured therein. The coil 33 is bonded and secured to the slider main body 31 through the piezoelectric element 32. The coil 33 and the piezoelectric element 32 are arranged independently of a slide guide 24 so that they are not in contact therewith. A voltage must be applied to the piezoelectric element 32 in order to impact drive the slider 22, and a piezoelectric element wiring 321 for this purpose is taken out to the outside so as to travel along the optical fiber 21.

The position of the micro actuator is detected by the magnetic sensor 34 attached to the slider main body 31. The magnetic sensor 34 is attached to the slider main body 31 such that the head portion thereof extends off the slider main body 31. A magnetized pattern 35 is provided on the board 23 so as to face the magnetic sensor 34 attached to the slider main body 31. A magnetic sensor wiring 341 from the magnetic sensor 34 is also taken out to the outside so as to travel along the optical fiber 21.

As to the arrangement of the example, finally, the size of the mechanical type optical switch in its entirety will be described. The number of the guides along which the sliders travel are set to 100 pieces, and the guides are disposed at pitches of 4 mm (in FIG. 1, the intervals between the guides are increased and the number of the guides is omitted for easy understanding). The boards 13 is formed in a shape having a size of 408 mm×408 mm×10 mm thick.

(Operation of the Example)

Figure 15:
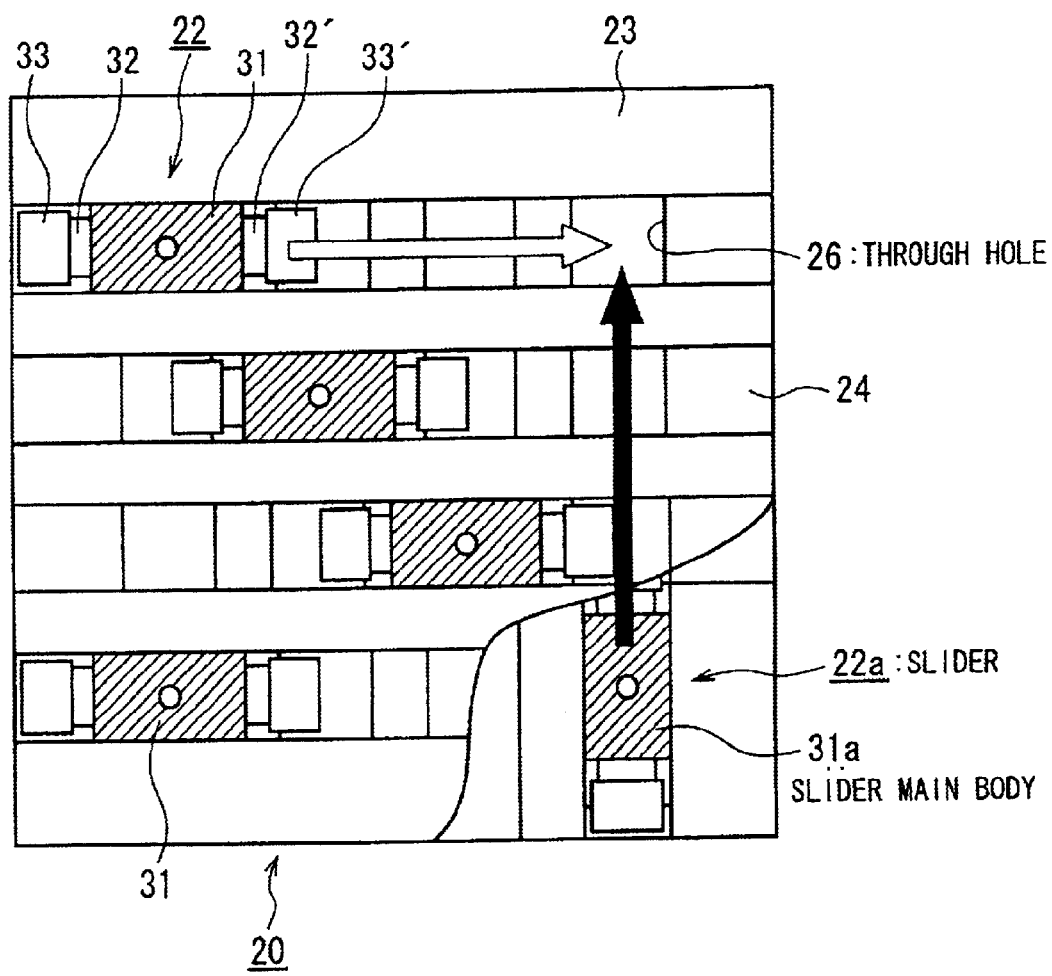
FIG. 15 is a schematic plan view of the mechanical type optical switch of the example of the present invention.
Figure 16:
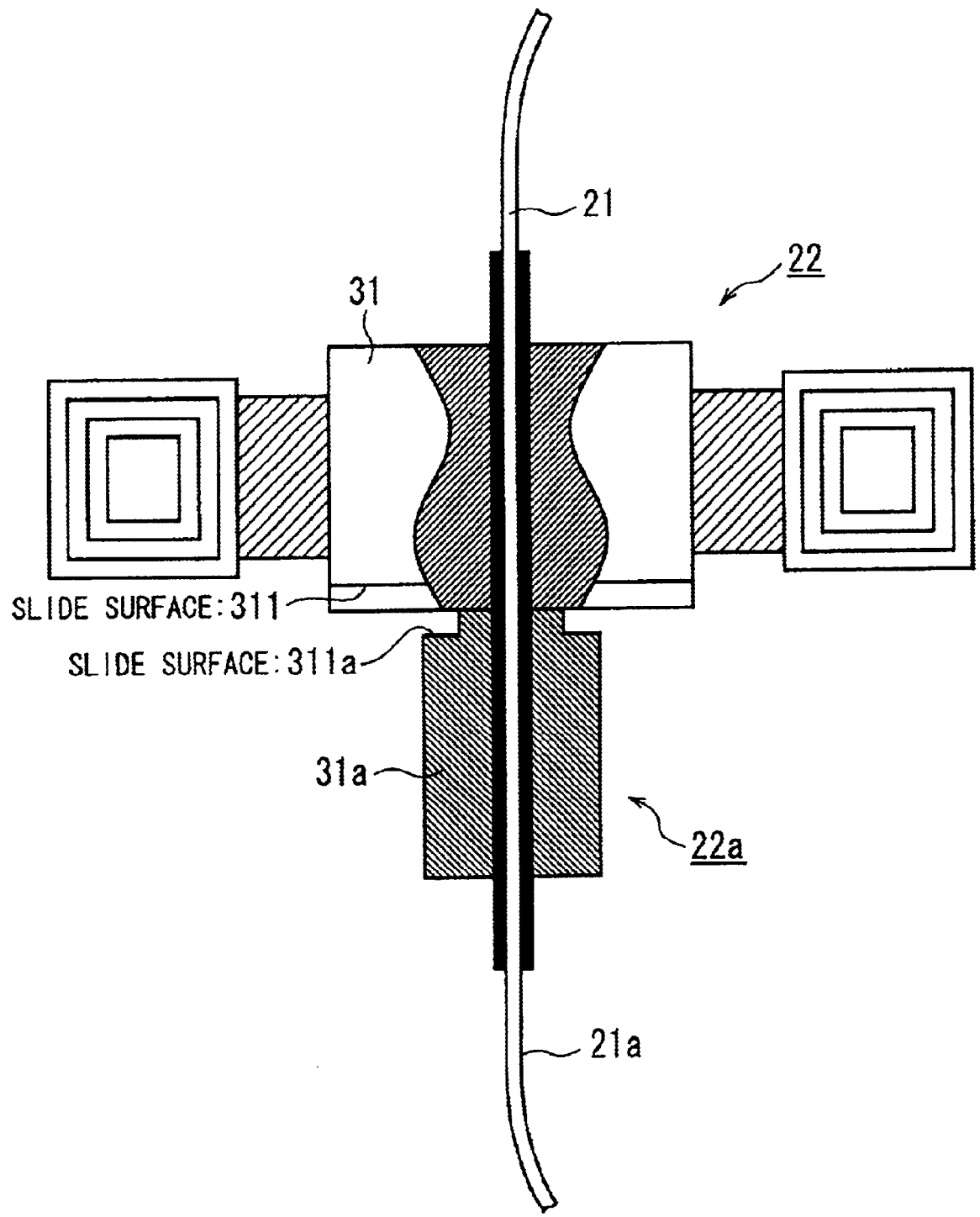
FIG. 16 is a view explaining an operation of the mechanical type optical switch of the example of the present invention.

Next, an operation of the mechanical type optical switch of the example of the present invention will be described. In the mechanical type optical switch 20 shown in FIG. 13, the optical fibers drawn onto the front and back surfaces of the board 23 are moved to a position where the fiber cores thereof are aligned with each other, thereby they are switched and connected to each other. FIG. 15 is a plan view showing the schematic state of the above operation (in the figure, a step formed in each slide guide 24 is omitted to simplify the figure). In FIG. 15, sliders 22 and 22a on the front and back surfaces of the board 23 are moved in a white arrow direction and a black arrow direction, respectively, and the connection of optical fibers to each other is completed by aligning the cores thereof within a through hole 26 formed through the boards 23. FIG. 16 is a sectional view showing the sliders 22 and 22a when the cores of the optical fibers are aligned with each other. The slider main body 31 of the slider 22 on the front surface of the board 23 reciprocates in a right and left direction on the sheet surface with the slide surface 311 thereof in contact with the guide surface of the board 23. In contrast, the slider main body 31a of the sliders 22a on the back surface of the board 23 reciprocates in a vertical direction on the sheet surface with the slide surface 311a thereof in contact with the guide surface of the board 23. The guide surface with which the slide surface 311 comes into contact is a guide surface 36 shown in FIG. 14(a). In this state, the optical fiber 21 drawn onto the front surface side is aligned with the optical fiber 21a drawn from the back surface side so that they are connected to each other.

Subsequently, the operation of the mechanical type optical switch will be described in more detail. First, in the mechanical type optical switch 20 shown in FIG. 15, when a command for joining the optical fiber of the slider 22 to the optical fiber of the slider 22a is supplied to a control system (not shown) first, coils 33 and 33' are energized to drive the sliders to which the optical fibers to be switched are attached. At this time, the respective sliders perform an electromagnetic type linear motor operation while the polarities of the energized coils are switched, as shown in FIG. 3. At this time, the sliders 20 and 22a move long distances at high velocity along the slide guides 24 on the boards 23. They complete the movement in about 20 ms at a maximum. As shown in FIG. 15, when the sliders 22 are roughly moved to the column of the slider 22a and the slider 22a are roughly moved to the row of the sliders 22 by the linear motor operation, the sliders 22 is aligned with the slider 22a by the impact drive micro actuators formed in the sliders 22a in an order of submicron. This impact drive is carried out in such a manner that an attractive force is generated between the coils 33 and 33' and a permanent magnets, respectively, by supplying a current to the coils 33 and 33' and the pressure force of the slider main body 31 against the guide surfaces of the board is obtained thereby. However, since the operation principle of the impact drive operation of the sliders of the example is as described above with reference to FIG. 4, the detailed description thereof is omitted.

Figure 17A:
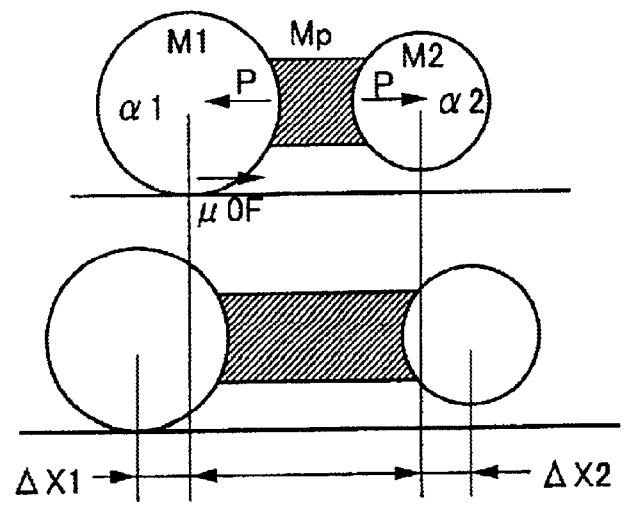
FIG. 17(a) and FIG. 17(b) are drawings explaining the operation of the mechanical type optical switch of the example of the present invention.
Figure 17B:
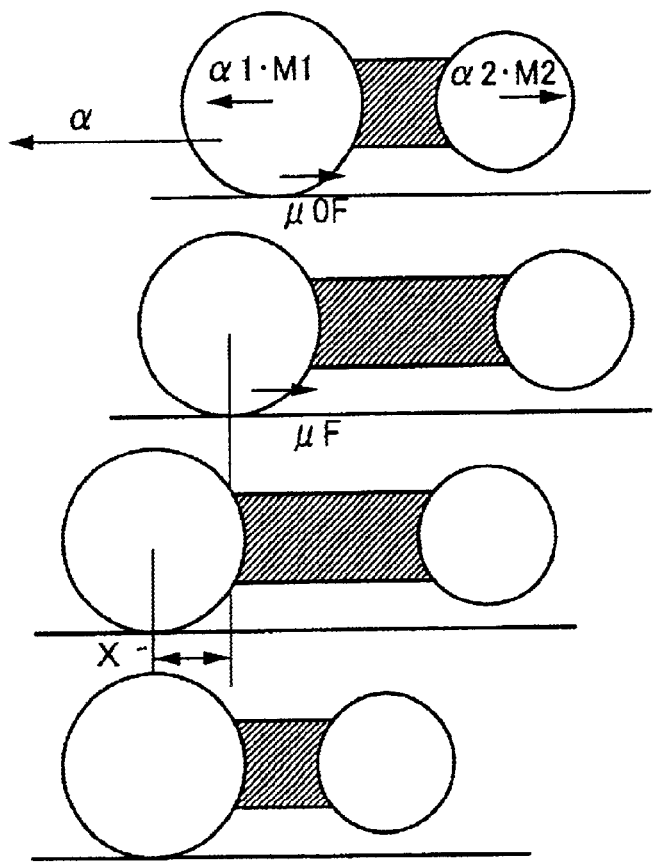
Figure 18A:
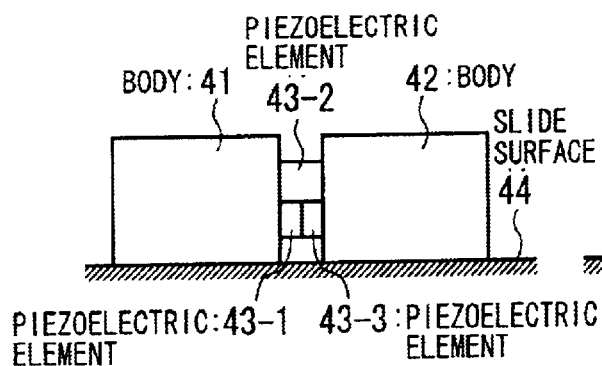
FIG. 18(a) to FIG. 18(g) are drawings explaining the operation principle of an inchworm drive system.
Figure 18B:
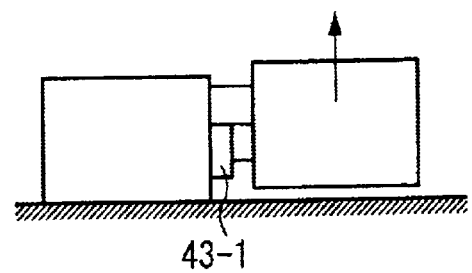
Figure 18C:
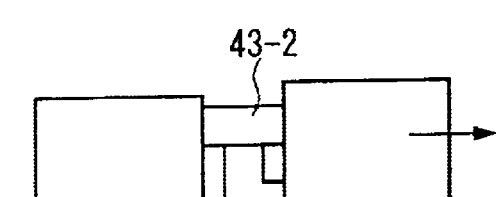
Figure 18D:
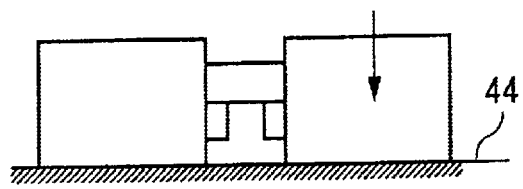
Figure 18E:
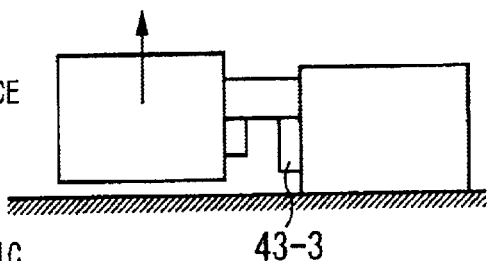
Figure 18F:
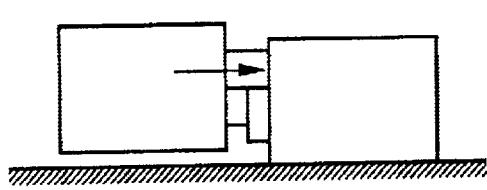
Figure 18G:
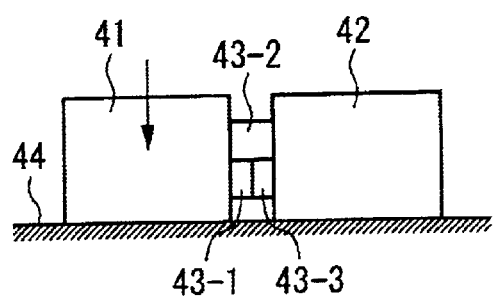
Figure 19A:
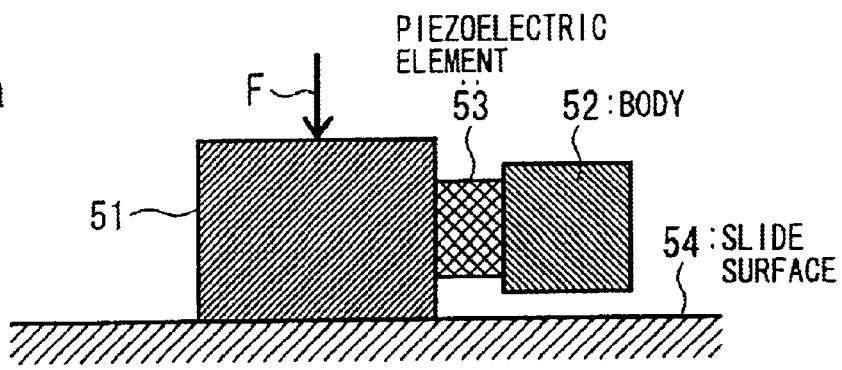
FIG. 19(a) to FIG. 19(c) are drawings explaining the operation principle of an impact drive system.
Figure 19B:
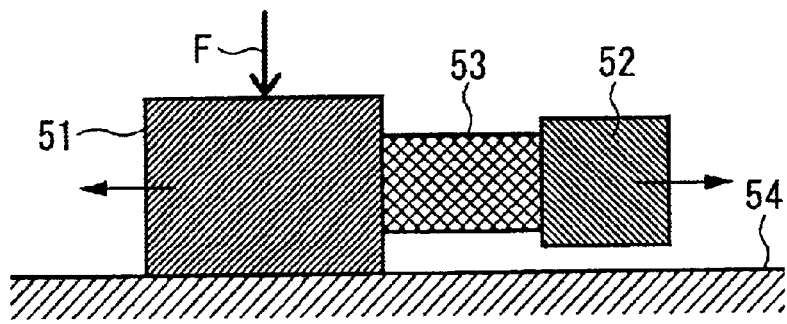
Figure 19C:
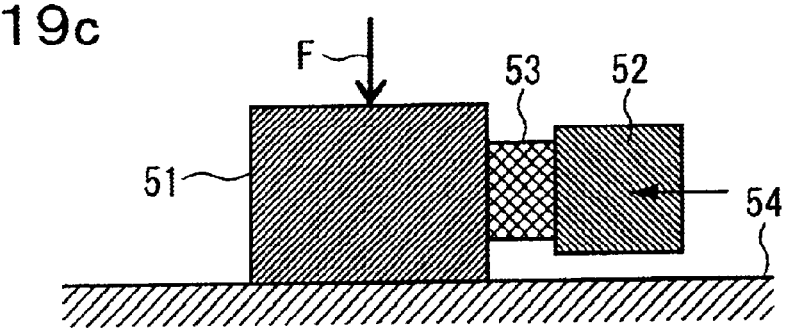

The operation performance of the impact drive in this example will be described with reference to FIG. 17. Note that only one set of a coil and a piezoelectric element is used in FIG. 17 and the coil is arranged as a simple inertial body for the purpose of simplification. First, a calculation method will be briefly described. In this example, a PZT piezoelectric element is used as the piezoelectric elements. When the PZT piezoelectric element extends by a voltage applied thereto, a slider moves in an amount of movement ($\Delta X1$). The slider, the PZT piezoelectric element and the inertial body slide and move as a single rigid body in an amount of movement (X). Then, the total of the amount of movement ($\Delta X1$) and the amount of movement (X) is defined as a total amount of movement per 1 pulse. A time passed in the operation of the one pulse is defined as one cycle (T), and a feed velocity is defined as a product of the total amount of movement and (1/T).

Next, equations will be shown in detail. Kinetic equations when a voltage is applied to the PZT piezoelectric element and it generates an extension force (P) are established as to the slider (mass: M1), the inertial body (mass: M2), and the piezoelectric element (mass: Mp).

When the coefficient of static friction of the slider at this time is represented by $\mu 0$, a frictional force ($\mu 0 F$) is generated in the slider by a pressure force F as shown in the following equations (1) and (2).

$$P - \mu 0 \cdot F = \alpha 1 \cdot (M1 + 0.5 Mp) \tag{1}$$

$$P = \alpha 2 \cdot (M2 + 0.5 Mp) \tag{2}$$

The accelerations ($\alpha 1$ and $\alpha 2$) of the slider and the inertial body are determined from the equations (1) and (2), respectively. The amount of extension ($\Delta X$) of the piezoelectric element is the total of the moving amount ($\Delta X1$) of the slider and the moving amount ($\Delta X2$) of the inertial body. Thus, the following equation (3) is obtained.

$$\Delta X = \Delta X1 + \Delta X2 \tag{3}$$

Further, the moving amounts of the slider and the inertial body are determined by the following equations (4).

$$\Delta X1 = 0.5 * (0.5 * \alpha 1) * \Delta t^2$$

$$\Delta X2 = 0.5 * (0.5 * \alpha 2) * \Delta t^2 \tag{4}$$

Accordingly, the moving amount ($\Delta X1$) of the slider can be calculated using the equations (1) to (4). It is contemplated here that the accelerations $\alpha$ continuously changes during the time $\Delta t$. In this calculation, the accelerations are multiplied by 0.5 and linearly approximated.

Next, the moving amount of the overall system when it slides as a rigid body is determined. First, the initial velocities of the respective mass systems are determined by the following equations (5).

$$V01 = (0.5 \cdot \alpha 1) \cdot \Delta t$$

$$V02 = (0.52 \cdot \alpha 2) \cdot \Delta t \tag{5}$$

Accordingly, the momenta of the respective mass systems are determined by the following equations (6).

$$MV1 = V01 \cdot (M1 + 0.5 \cdot Mp)$$

$$MV2 = V02 \cdot (M2 + 0.5 Mp) \tag{6}$$

An entire momentum is represented by the following equation from the law of conservation of momentum, thereby the initial velocity (V0) when an overall system begins to move (V0) is determined by the following equation (7).

$$(M1 + M2 + Mp) \cdot V0 = MV1 - MV2 \tag{7}$$

The kinetic energy (E) at that time is determined by the following equation (8) using the initial velocity determined by the equation (7).

$$E = 0.5 \cdot (M1 + M2 + Mp) \cdot V0^2 \tag{8}$$

The sliding amount (X) of the overall system is determined by the following equation (9) assuming that the above energy has been entirely consumed as a friction loss.

$$X = E / \mu F \tag{9}$$

where, $\mu$ shows a coefficient of dynamic friction.

The acceleration (a) when the overall system slides is represented by the by the following equation (10).

$$(M1 + M2 + Mp) \cdot a = \mu F \tag{10}$$

Thus, the period of time (ts) passed from the time the overall system begins to move to the time it stops is represented by the following equation (11).

$$ts = V0 / a \tag{11}$$

Further, a period of time necessary to the feed of one pulse, that is, the cycle (T) is the total of the time ($\Delta t$) necessary to the expansion of the PZT piezoelectric element, the time (ts) during which the overall system slides as the rigid body, and further the time (tb) necessary for the contraction of the PZT piezoelectric element, as shown in by the following equation (12). The time (tb) necessary for the contraction of the PZT piezoelectric element is determined based on the assumption that the inertial force generated at that time is sufficiently small with respect to the frictional force ($\mu 0 F$).

$$T = \Delta t + ts + tb \tag{12}$$

A feed velocity (Vs) is determined from a total moving amount and the cycle (T), as shown in the following equation (13).

$$Vs = (\Delta X1 + X) / T \tag{13}$$

When the data of the specification of the actual piezoelectric elements, the mass of the sliders, and the like are input to the above equations, the moving amount per one path of the overall system and the moving velocity thereof are determined as shown below.

Moving amount per one pulse (resolution): 1 nm

Moving velocity: 10 $\mu$s/sec

The positions reached by both the rough movement carried out by the linear motor and the micro movement carried out by the impact drive are detected by the magnetic sensor 34 mounted on the slider main body 31. Since the magnetized pattern 35 is formed on the board 23 as described above, the position of the slider 22 itself can be determined by reading the magnetized pattern 35.

Note that it is required to align the optical axes of optical fibers at an accuracy of submicron. Therefore, the optical axes can be aligned with each other at a pinpoint accuracy by recording a magnetized pattern that corresponds to an optimum slider position as an address when the optical axes are adjusted. Further, it is also possible to align the optical axes periodically when optical fibers are not used and to update the optimum address, in addition to that they are subjected to alignment when an apparatus is shipped.

As described above in detail, since the actuator of the present invention includes a high velocity self-moving means and a self-moving means of micro pitch, there can be realized a common actuator that can move a large distance at high velocity as well as move at a pinpoint accuracy. According to the present invention, an actuator having the above characteristics can be realized compactly. Further, when an optical switch is arranged using the actuators according to the present invention, a mechanical type optical switch capable of performing high velocity switching with a less amount of optical loss can be realized compactly.

What is claimed is:

1. An optical switch comprising:

a board having a first and second main surfaces;

a first movable body to which a first optical fiber is secured;

a first piezoelectric element secured to said first movable body;

a first coil secured to said first piezoelectric element;

a first guide, provided on said first surface, for guiding said first movable body;

a plurality of permanent magnets disposed along said first guide;

a second movable body to which a second optical fiber is secured;

a second piezoelectric element secured to said second movable body;

a second coil secured to said second piezoelectric element;

a second guide, provided on said second surface and provided orthogonally to said first guide, for guiding said second movable body;

a plurality of permanent magnets disposed along said second guide; and a through hole formed at an intersection of said first guide and second guide provided on said board.

2. The optical switch according to claim 1, wherein said optical switch further comprising a first and second driving means for controlling said first and second movable body by impact drive or inchworm drive using said first and second piezoelectric elements, respectively.

3. An optical switch according to claim 1, wherein said optical switch further comprising a first and second position detecting means for detecting positions of said first and second optical fibers, respectively.

* * * * *